United States Patent
Hirasawa

(10) Patent No.: US 8,390,892 B2
(45) Date of Patent: Mar. 5, 2013

(54) SPOT COLOR PRINTING COLOR CONVERSION PROGRAM, COLOR CONVERSION DEVICE AND COLOR CONVERSION METHOD

(75) Inventor: Masahiko Hirasawa, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 739 days.

(21) Appl. No.: 12/575,365

(22) Filed: Oct. 7, 2009

(65) Prior Publication Data

US 2010/0085604 A1 Apr. 8, 2010

(30) Foreign Application Priority Data

Oct. 8, 2008 (JP) ................... 2008-261378

(51) Int. Cl.
- *H04N 1/405* (2006.01)
- *H04N 1/46* (2006.01)
- *G03F 3/08* (2006.01)
- *G06K 9/00* (2006.01)

(52) U.S. Cl. ....... 358/3.06; 358/521; 358/515; 358/518; 382/162; 382/167

(58) Field of Classification Search .............. 358/3.06, 358/1.9, 501, 518, 523, 2.1, 515, 521; 345/592; 347/43; 382/162, 167
See application file for complete search history.

(56) References Cited

U.S. PATENT DOCUMENTS 7,463,383 B2 * 12/2008 Nishide et al. ............. 358/1.9

FOREIGN PATENT DOCUMENTS

| JP | 2005-278074 A | 10/2005 |
| JP | 2005-328197 A | 11/2005 |
| JP | 2006-287708 A | 10/2006 |

* cited by examiner

*Primary Examiner* — Charlotte M Baker
(74) *Attorney, Agent, or Firm* — Kilpatrick Townsend & Stockton LLP

(57) ABSTRACT

Provided is a spot color printing color converting device including: an image data acquiring unit for acquiring image data in which the colors of pixels are represented by the gradation values of a first color coordinate system; a spot color list acquiring unit for acquiring a spot color list associating the gradation values of the first color coordinate system with the ink gradation values of a second color coordinate system specifying the gradation of ink colors for printing spot colors.

5 Claims, 6 Drawing Sheets

FIG. 2

SPOT COLOR LIST

| INDEX NUMBER | FIRST COLOR COORDINATE SYSTEM | | | SECOND COLOR COORDINATE SYSTEM | | | |
|---|---|---|---|---|---|---|---|
| | R | G | B | C | M | Y | K |
| NO.1 | FF | FF | FF | 0 | 10 | 30 | FF |
| NO.2 | FF | 00 | 10 | 10 | FF | FF | FF |
| NO.3 | D0 | D0 | D0 | ... | ... | ... | ... |
| NO.4 | C0 | 00 | 00 | ... | ... | ... | ... |

FIG. 6
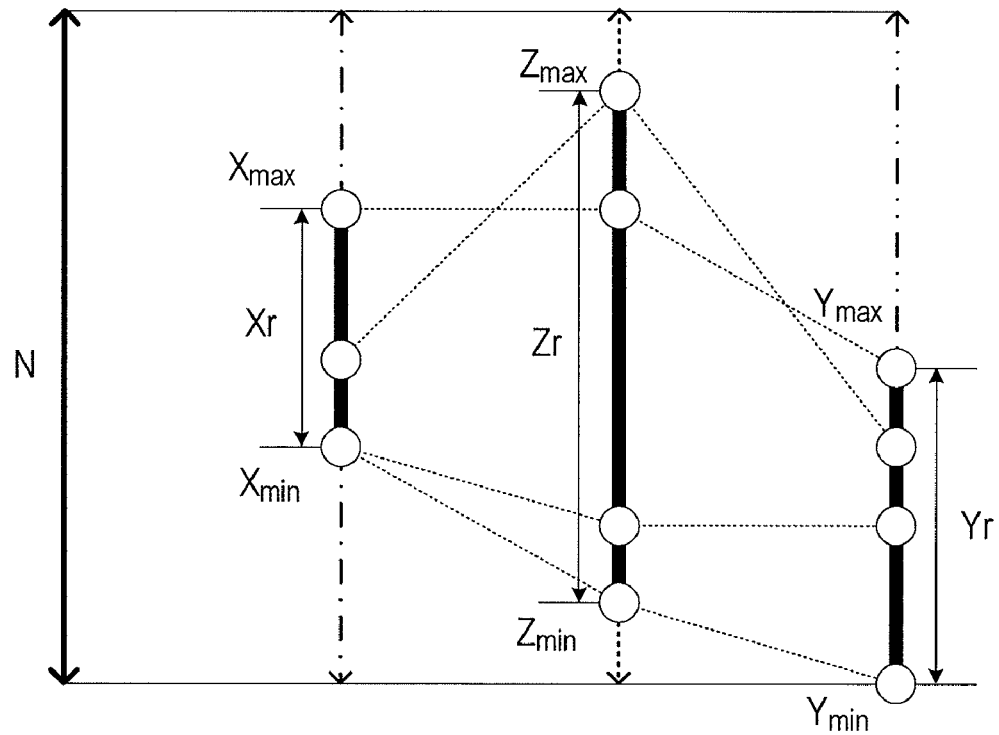
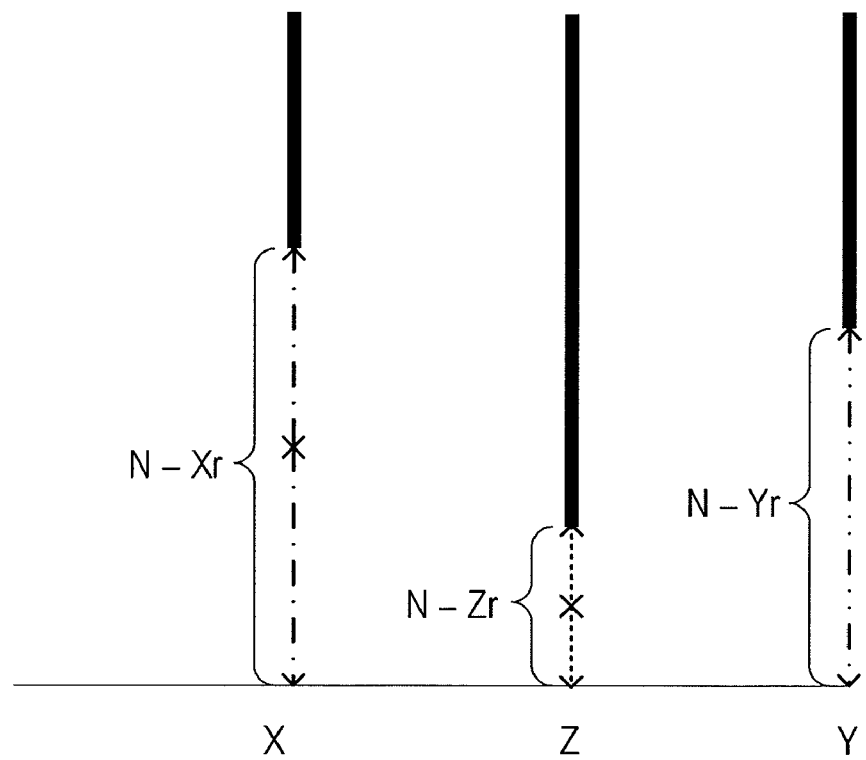

SPOT COLOR PRINTING COLOR CONVERSION PROGRAM, COLOR CONVERSION DEVICE AND COLOR CONVERSION METHOD

The entire disclosure of Japanese Patent Application No. 2008-261378, filed Oct. 8, 2008 is expressly incorporated by reference herein.

BACKGROUND

1. Technical Field

The present invention relates to a spot color printing color conversion program, a color conversion device and a color conversion method.

2. Related Art

In the related art, if a personal computer instructs the execution of printing to a printer, a color conversion process for converting the values representing the color of each pixel of the image data of an image to be printed into the gradation of ink colors, a halftone process and a rearrangement process are executed and the printer executes printing based on print data generated by these processes. In the color conversion process, image data represented by a RGB color coordinate system is converted into CMYK values by an interpolation operation using a Lookup Table (LUT). However, if a RGB value is not accurately specified in a color management state, the CMYK values converted using the LUT and the CMYK values which accurately representing a desired color on a printing medium will not necessarily coincide with each other. In addition, there are CMYK values which cannot be derived from the interpolation operation using the LUT. To accurately output a desired color, the color conversion using the LUT is not performed, but color conversion is performed by another method with respect to pixels which are to be accurately output in a desired color. For example, generally, like JP-A-2006-287708, color conversion is performed by referring to association information for spot color printing color conversion. In the corresponding information, direct association is performed such that a pixel represented by a specific RGB value of input image data is converted into a desired CMYK value.

In color conversion technology using spot color printing association information, it took a long processing time to distinguish a pixel (hereinafter, referred to as a spot color pixel), which is printed with an ink gradation value specified by a user, from image data of an image to be printed. In detail, if the number of spot colors is Ns, an operation for determining whether the pixel is a spot color pixel with respect to the pixels of image data is performed Ns times without omission, and thus the processing time was long.

SUMMARY

An advantage of some aspects of the invention is that it provides technology for shortening the processing time for determining spot color pixels.

In the invention, image data of a first color coordinate system is acquired, a spot color list associating the gradation values represented by the first color coordinate system with the ink gradation values of a second color coordinate system specifying the gradation of ink colors for printing spot colors is acquired, a numerical value range between a minimum value and a maximum value out of a plurality of gradation values of the first color coordinate system associated with the ink gradation values of the second color coordinate system in the spot color list is acquired, it is determined whether the gradation value of a pixel to be converted from the image data is within the numerical value range, if the gradation value is within the numerical value range, it is determined whether the gradation value of the pixel to be converted coincides with any one gradation value in the numerical value range, and the gradation value of the pixel to be converted is converted into the ink gradation value of the second color coordinate system associated in the spot color list, if the gradation value of the pixel to be converted coincides with any one gradation value in the numerical value range.

According to the invention, it is possible to shorten the processing time for determining whether a pixel is a spot color pixel with respect to the pixels configuring the image data, compared with the configuration of the related art in which it is determined whether the pixel is a spot color pixel by the number of kinds of spot colors with respect to the pixels of the image data of an image to be printed. The reason is because the numerical value range of the gradation values of the first color coordinate system corresponding to the plurality of ink gradation values defined in the spot color list is acquired before the spot color pixel determination, it is first determined whether the gradation value of the pixel to be converted is within the numerical value range at the time of the spot color pixel determination, and, when it is determined that the gradation value of the pixel to be converted is outside the numerical value range, the pixel to be converted is not a spot color pixel at that time. The determination whether the gradation value of the pixel to be converted is within the numerical value range refers to the determination whether the gradation value of the pixel to be converted is equal to or more than the minimum value and equal to or less than the maximum value of the gradation value of the first color coordinate system defined in the spot color list. In addition, it is determined whether the pixel which is determined to be in the numerical value range coincides with any one gradation value defined in the spot color list. Accordingly, it is possible to shorten the processing time for the spot color pixel determination, compared with the configuration of the related art.

In the image data acquiring function, the image data in which the colors of the pixels are represented by the color coordinate system (first color coordinate system) to be converted into the second color coordinate system specifying the ink gradation values of each ink color may be acquired. Accordingly, the first color coordinate system may be a color coordinate system representing colors (grayscale) by using a single channel or a color coordinate system representing colors by using a plurality of channels. As the latter color coordinate system, for example, a RGB color coordinate system may be employed.

In the spot color list acquiring function, the spot color list associating the gradation values represented by the first color coordinate system with the ink gradation values of the second color coordinate system specifying the gradation of the ink colors for printing the spot colors may be acquired. The second color coordinate system is an ink color coordinate using ink colors as color components, and various patterns (for example, CMYK color coordinate system) may be employed according to the kind of ink used. A spot color is a color requiring accuracy of the color as the output result. For example, a spot color is a color which cannot be output using with the LUT or the color conversion, it is not conclusive whether or not it can be output using the color conversion with the LUT or a color which is more preferably obtained by directly specifying the ink gradation value rather than specifying the gradation value by the first color coordinate system. In the spot color list, the gradation value represented by the first color coordinate system may be converted into the ink gradation value corresponding to a spot color by referring to the list. Accordingly, the detailed data structure is arbitrary.

In the numerical value range acquiring function, the numerical value range between the minimum value and the maximum value out of the gradation values of the plurality of first color coordinate system associated in the spot color list may be acquired. If the first color coordinate system is represented by the gradation values of the plurality of channels, the numerical value range may be acquired with respect to each of the channels. In addition, the numerical value range may be dynamically derived from the color conversion program of the invention based on the spot color list or the numerical value range specified at a point in time when the above-described spot color list is defined may be acquired concomitantly with the acquisition of the spot color list.

In the spot color pixel determining function, it may be determined whether the gradation value of the pixel to be converted from the image data is within the above-described numerical value range and if the gradation value of the pixel to be converted from the image data is within the numerical value range, it may be determined whether the gradation value of the pixel to be converted coincides with any one gradation value in the numerical value range. The conversion from the first color coordinate system into the second color coordinate system is sequentially performed with respect to the pixels configuring the image data. The pixel to be converted indicates a pixel which will be converted next in the sequential conversion.

In the color conversion function, if the gradation value of the pixel to be converted coincides with any one gradation value in the numerical value range, the gradation value of the pixel to be converted may be converted into the ink gradation value of the second color coordinate system associated in the spot color list. In addition, in the above-described spot color pixel determining function, with respect to the pixels which are determined to be not in the numerical value range or the pixels which are determined to be not coincident with any gradation value in the numerical number range, for example, the color conversion by the known interpolation operation using the LUT is performed.

In the invention, when the gradation values of the first color coordinate system are represented by the gradation values of n (n is an integer of 3 or more) channels, the numerical value range acquiring function may have a function for acquiring the numerical value range with respect to the n channels. In addition, the spot color pixel determining function may sequentially determine whether the gradation value of the pixel to be converted coincides with any one gradation value in the numerical value range starting from the gradation value of the channel having the minimum numerical value range out of the n channels, and perform the determination of the channel having the smaller $m^{th}$ (m is an integer where $2 \leq m \leq n$) numerical value range if it is determined that the gradation value of a channel having a smaller $(m-1)^{th}$ numerical value range is within the numerical value range.

That is, if the gradation value of the pixel to be converted is outside the numerical value range, it may be determined that the pixel to be converted at that time is not a spot color pixel. However, if the numerical value inside determination (numerical value inside/outside range determination) is performed for each gradation, the determination is performed from the channel having the smaller numerical value range. If the maximum range (maximum color number) of a value which can be taken in the data structure is N, the numerical value range of the channel X having the minimum numerical value range in the spot color list is Xr and the numerical value range of the channel Y having the next smallest numerical value range is Yr, since (N-Xr)>(N-Yr), the range outside of the numerical value range in the channel X is larger than that of the channel Y. Therefore, it can be considered that there is a higher probability that the gradation value is included in the range outside of the numerical value range in the case of the channel X than for the channel Y. Accordingly, there is a higher probability that the pixel which is not a spot color pixel can be more quickly eliminated in the spot color pixel determination when the numeral value inside/outside range determination is first performed from the channel X, compared with when the numeral value inside/outside range determination is performed from the channel Y. Thus, there is a high probability that the processing time is further shortened. When the numerical value inside/outside range determination is first performed in the channel X, a pixel may be determined to be not a spot color pixel at that point in time because the gradation value is not in the numerical value range. However, with respect to that pixel, if the numerical value inside/outside range determination is performed from the channel Y and the gradation value is within the numerical value range in the channel Y, there is a high probability that it is not yet determined whether the pixel to be converted is a spot color pixel at this point in time.

In the invention, controlling of the outputting of an image to a printing medium may be performed based on image data which is color-converted from the first color coordinate system into the second color coordinate system. Accordingly, it is possible to print image data including spot color pixels in a short period of time.

In addition, like the invention, the technique is applicable to a program or a method for determining whether the gradation value of the image pixel coincides with any one gradation value in the numerical value range when the gradation of the image data is within the numerical value range of the gradation value defined in the spot color list and converting the gradation value of the pixel to be converted into the ink gradation value of the second color coordinate system associated in the spot color list when the gradation value of the pixel to be converted coincides with any one gradation value in the numerical value range. The printing device, the program and the method may be realized as a single printing device or a combination of a plurality of devices, and includes various aspects. For example, the printing device, the method and the program according to the invention can be provided by the combination of a computer and a printing device. In addition, a portion may be software or a portion may be hardware, that is, appropriate modification is possible. The invention may be accomplished by a recording medium with a program for controlling the printing device. The recording medium with the software may be a magnetic recording medium or a magnetooptical recording medium. The same is true even in regard to any recording medium which will be developed in the future.

BRIEF DESCRIPTION OF THE DRAWINGS

The invention will be described with reference to the accompanying drawings, wherein like numbers reference like elements.

FIG. 2 is a view explaining the data structure of a spot color list.

FIG. 6 is a view explaining the numerical value range and the gradation value of each channel.

DESCRIPTION OF EXEMPLARY EMBODIMENTS

Figure 1:
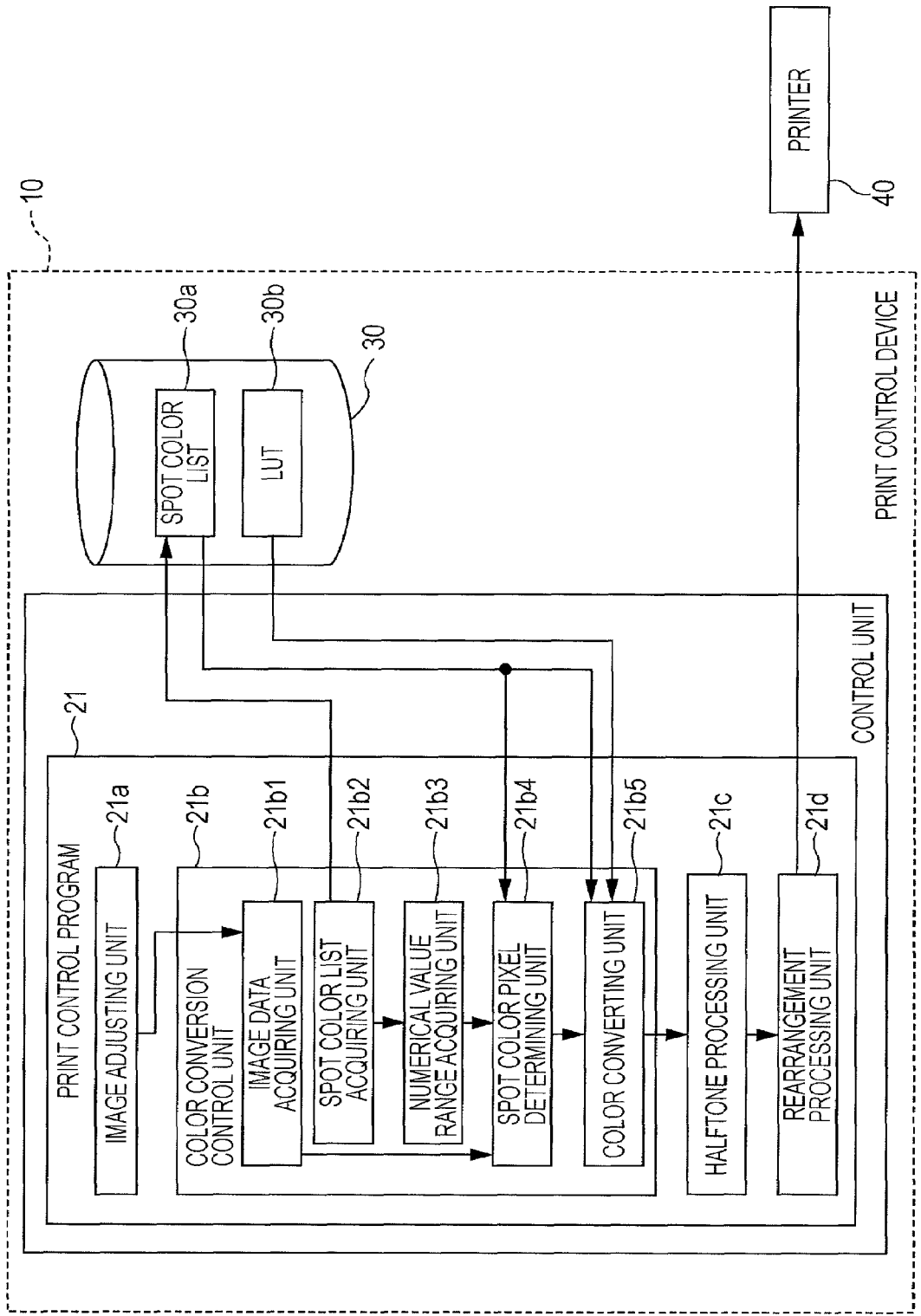
FIG. 1 is a block diagram showing the configuration of a printing device.

Hereinafter, the embodiments of the invention will be described in the following order.
(1) Configuration of Printing Device
(2) Print Control Process
(3) Other Embodiments (1) Configuration of Printing Device FIG. 1 is a block diagram showing the configuration of a print control device 10 according to the invention. The print control device 10 includes a control unit 20 including a RAM, a ROM, a CPU and the like, and the control unit 20 can execute a program recorded on the ROM or a storage medium 30. In the present embodiment, a print control program 21 can be executed as a program, and the print control program 21 includes a spot color printing function for printing image data including spot color pixels. In the present specification, a spot color pixel refers to a pixel which is printed with an ink gradation value specified by a user.

The print control device 10 includes an interface (not shown) and outputs print data to a printer 40 via the interface. The printer 40 is an ink jet printer which includes a transportation unit with a mechanism for transporting a printing medium, a carriage which reciprocally moves in a direction perpendicular to a transportation direction, an ink cartridge mounted in the carriage and with inks of respective colors stored therein, and a print head. The print control program 21 includes an image adjusting unit 21a, a color conversion control unit 21b, a halftone processing unit 21c, and a rearrangement processing unit 21d, in order to realize the above-described spot color printing function.

The image adjusting unit 21a is a module for adjusting an image coinciding with a print condition. Due to processing by the image adjusting unit 21a, the control unit 20 performs an interpolation process with respect to acquired image data if necessary, and generates data with a number of pixels according to the print resolution from the image data.

The color conversion control unit 21b is a module for converting the color coordinate system of the generated image data. In the present embodiment, due to processing by the color conversion control unit 21b, the image data generated by the image adjusting unit 21a is data represented by a RGB color coordinate system (first color coordinate system), and the control unit 20 converts data, of which the colors are represented by the RGB color coordinate system, into data of which the colors are represented by an ink color coordinate system (second color coordinate system) in which the colors of the inks are color components. Accordingly, the color conversion control unit 21b includes an image data acquiring unit 21b1, a spot color list acquiring unit 21b2, a data range acquiring unit 21b3, a spot color pixel determining unit 21b4, and a color converting unit 21b5.

The image data acquiring unit 21b1 is a module for acquiring image data representing an image to be printed, and due to processing by the image data acquiring unit 21b1, the control unit 20 acquires image data after the processing by the image adjusting unit 21a.

The spot color list acquiring unit 21b2 is a module for allowing the control unit 20 to realize a function of a spot color list associating gradation values represented by the first color coordinate system with ink gradation values of the second color coordinate system specifying the gradation of ink colors for printing spot colors. In the present embodiment, the spot color list is prepared by the user who operates a keyboard or a mouse (not shown) included in the print control device 10, and the prepared spot color list 30a is stored in the storage medium 30. In the present embodiment, as shown in FIG. 2, the spot color list is used which associates the gradation values represented by the RGB color coordinate system with the ink gradation values corresponding to the spot colors represented by the CMYK color coordinate system. Index numbers are numbers for identifying the individual associations in the spot color list.

The numerical value range acquiring unit 21b3 is a module for allowing the control unit 20 to realize a function for acquiring the numerical value range between a minimum value and a maximum value of a plurality of gradation values of the first color coordinate system associated in the spot color list. The numerical value range is the range of the gradation values of the first color coordinate system defined in the spot color list, and is represented as a range equal to or more than the minimum value and equal to or less than the maximum value of the gradation values. For example, in the spot color list shown in FIG. 2, the number of spot colors is four, and, among the four gradation values, the minimum value $R_{min}$ of an R channel is 0xC0 and the maximum value $R_{max}$ thereof is 0xFF. Accordingly, the numerical value range of the R channel may be represented by (0xFF−0xC0+1). The numerical value range may be dynamically derived by the color conversion control unit 21b based on the spot color list as described above, or the numerical value range specified at a point in time when the above-described spot color list is defined may be acquired by the acquisition of the spot color list.

The spot color pixel determining unit 21b4 is a module for determining whether a pixel is a spot color pixel with respect to the pixels in the image data, and the control unit 20 first determines whether the gradation value of a pixel to be converted from the image data is within the above-described numerical value range due to processing by the spot color pixel determining unit 21b4, and if the gradation value is within the numerical value range, determines whether the gradation value of the pixel to be converted coincides with any one gradation value in the numerical value range.

The color converting unit 21b5 is a module for allowing the control unit 20 to realize a function for converting the gradation value of the pixel to be converted, which is determined to have coincided due to processing by the above-described spot color pixel determining unit 21b4, into the ink gradation value of the second color coordinate system by referring to the spot color list. The color converting unit 21b5 performs color conversion by the interpolation operation using an LUT, with respect to the pixel which is determined to be not in the numerical value range or the pixel which is determined not to coincide with any gradation value in the numerical number range by the above-described spot color pixel determining unit 21b4. The LUT30b which is used for the interpolation operation is stored in the storage medium 30.

The halftone processing unit 21c is a module for performing a halftone process with respect to the data which is color-converted due to processing by the color converting unit 21b5. The control unit 20 generates data indicating the amount (presence/absence of ink or ink amount per ink droplet) of ink to be used of each pixel based on the above-described color-converted data, the process of the halftone processing unit 21c.

The arrangement processing unit 21d is a module for rearranging data after the halftone process, generating print data, and executing printing based on the print data. The above-described printer 40 outputs an image to a printing medium using the print data output from the print control device 10 via the processing by the rearrangement processing unit 21d.

Up to now, the configuration of the print control device 10 was described.

(2) Print Control Process

Figure 3:
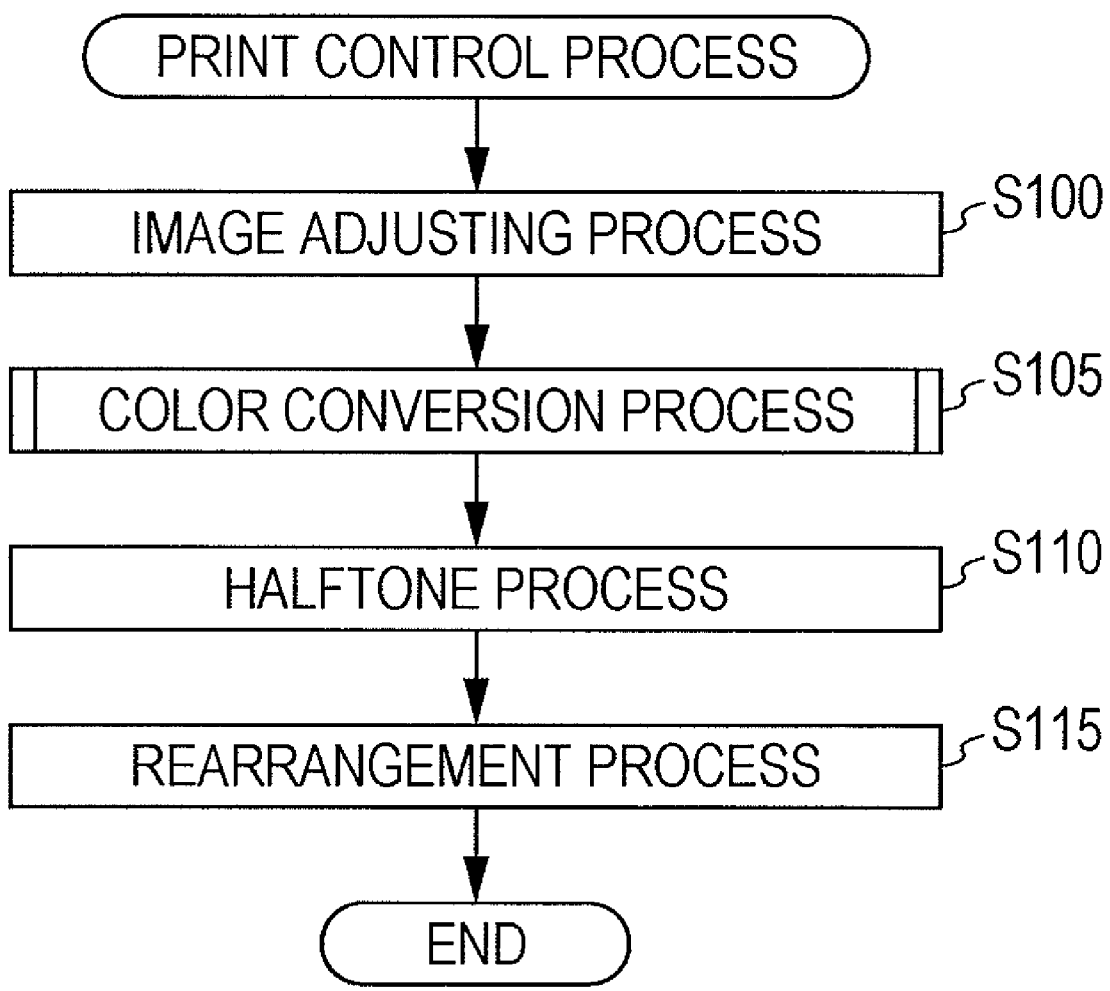
FIG. 3 is a flowchart showing a print control process.

Next, the print control process of the above-described configuration will be described. In the print control process, as shown in FIG. 3, an image adjusting process (step S100), a color conversion process (step S105), a halftone process (step S110) and a rearrangement process (step S115) are performed. Since the processing contents of the image adjusting process, the halftone process and the rearrangement process are described above, the color conversion process of step S105 will be described herein in detail.

Figure 4:
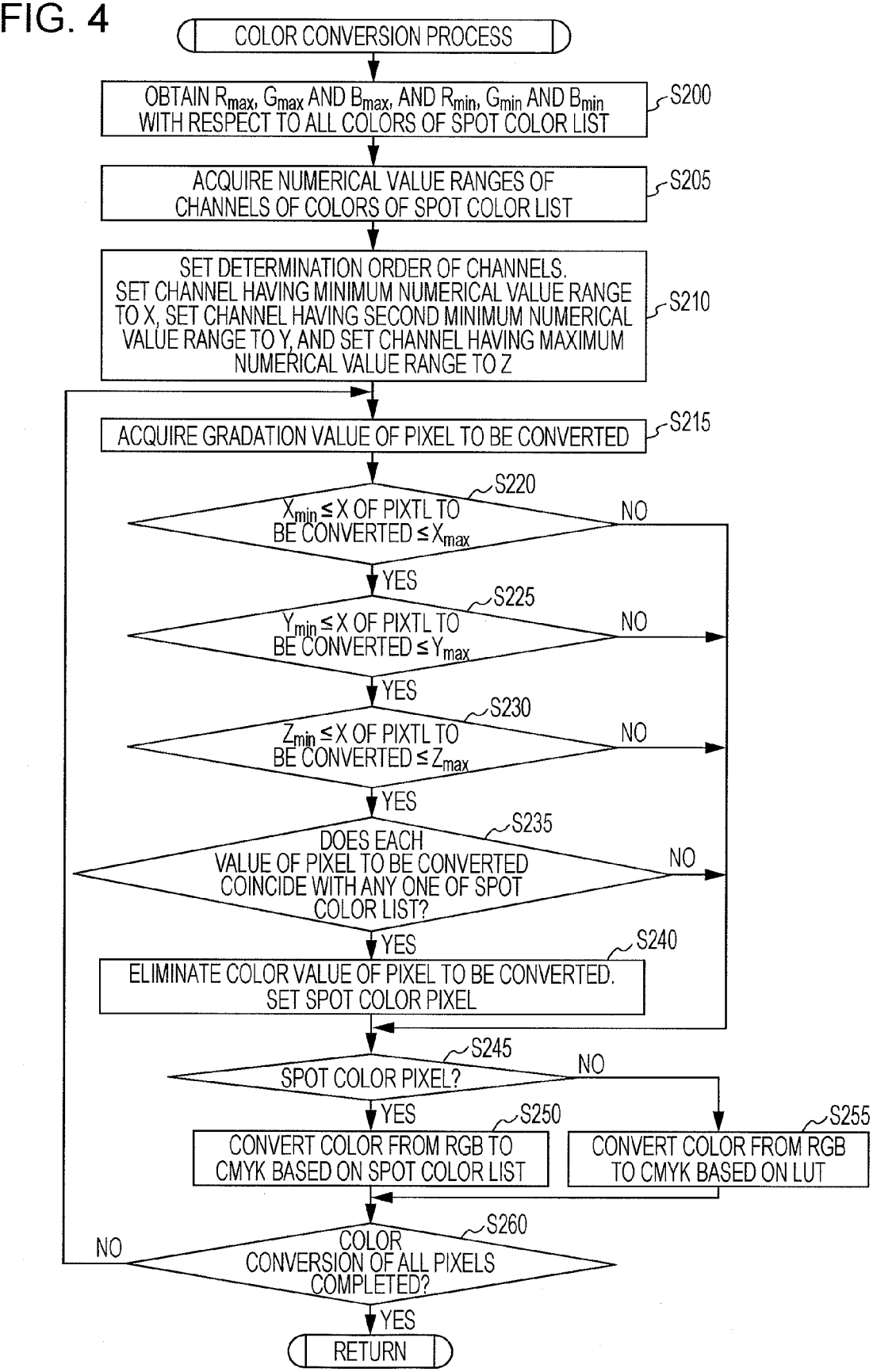
FIG. 4 is a flowchart showing a color conversion process.

FIG. 4 is a flowchart showing the flow of the color conversion process. First, the control unit 20 acquires the spot color list due to processing by the spot color list acquiring unit 21b2, and obtains the maximum values and the minimum values of the gradation values, with respect to the gradation values of the first color coordinate system defined in the spot color list due to processing by the numerical value range acquiring unit 21b3 (step S200). The maximum values and the minimum values of RGB channels are denoted by $R_{max}$, $G_{max}$, $B_{max}$, $R_{min}$, $G_{min}$ and $B_{min}$, respectively, Next, the control unit 20 acquires the numerical value range from the maximum values and the minimum values of the channels due to processing by the numerical value range acquiring unit 21b3 (step S205). In detail, for example, the numerical value range of the R channel is calculated as $R_{max}-R_{max}+1$. The numerical value ranges of the other channels are similarly obtained. Next, the control unit 20 compares the numerical value ranges of the three channels and sets the order of spot color pixel determination (step S210). Thereafter, the channel having the minimum numerical value range is X, the channel having the second smallest numerical value range is Y, the channel having the maximum numerical value range is Z, and the numerical value ranges thereof are respectively denoted by Xr, Yr and Zr.

Next, due to processing by the image data acquiring unit 21b1, the control unit 20 acquires the gradation value of the pixel to be color-converted in the image data represented by the RGB color coordinate system acquired by the image adjusting unit 21a (step S215). The pixel to be converted is shifted by one pixel whenever step S215 is executed. Next, due to processing by the spot color pixel determining unit 21b4, the control unit 20 determines whether the channel X gradation value of the pixel to be converted is within Xr with respect to the channel X having the first minimum numerical value range (step S220). In detail, the control unit 20 determines whether the channel X gradation value of the pixel to be converted is equal to or more than $X_{min}$ and equal to or less than $X_{max}$.

If it is determined that the channel X gradation value of the pixel to be converted is within Xr in step S220, the control unit 20 determines whether the channel Y gradation value of the pixel to be converted is within Yr with respect to the channel Y having the second smallest numerical value range due to processing by the spot color pixel determining unit 21b4 (step S225). If it is determined that the channel Y gradation value of the pixel to be converted is within Yr in step S225, the control unit 20 determines whether the channel Z gradation value of the pixel to be converted is within the numerical value range of Z with respect to the channel Z having the maximum numerical value range due to processing by the spot color pixel determining unit 21b4 (step S230).

If it is determined that the channel Z gradation value of the pixel to be converted is within Zr in step S230, the control unit 20 determines whether the gradation value of the pixel to be converted coincides with any one gradation value in the spot color list due to processing by the spot color pixel determining unit 21b4 (step S235). If all the determinations of steps S220 to S235 are "Y", the control unit 20 rewrites the gradation value of the pixel to be converted in information indicating the ink gradation value of a spot color due to processing by the color converting unit 21b5 (step S240).

Figure 5:
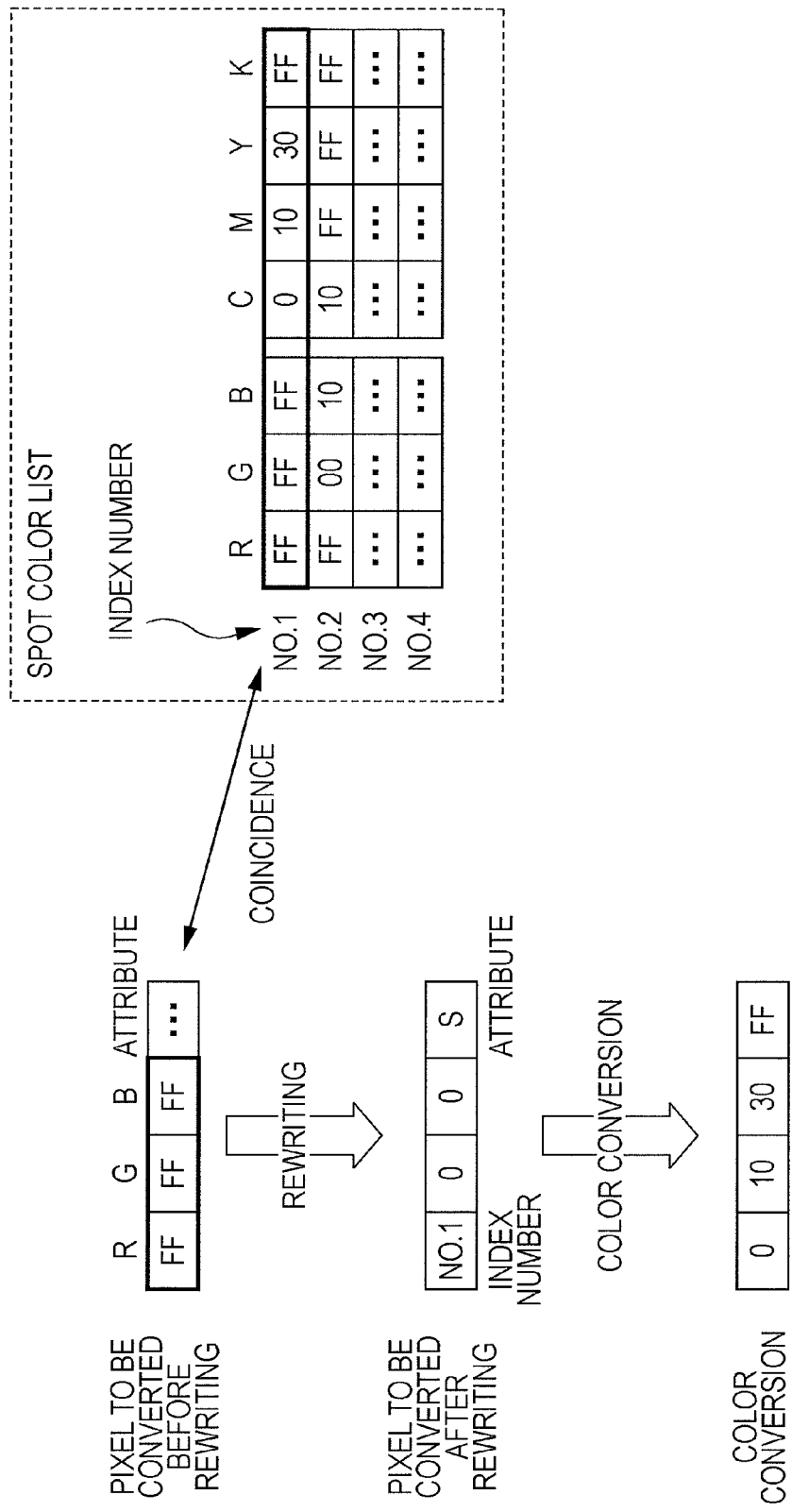
FIG. 5 is a view explaining the order of color conversion of a spot color pixel.

The detailed description is as follows. In the present embodiment, as shown in FIG. 5, information on one pixel is represented by 4-byte data, and the gradation value of each RGB value is represented by 1-byte data. In the residual 1 byte, information indicating the attribute of a pixel (a pixel configuring a character or a pixel configuring a photo) is stored. If the RGB value of the pixel to be converted coincides with any one RGB value of the spot color list, the data of the pixel to be converted is rewritten by the index number of the coinciding RGB value and an identifier indicating that the pixel to be converted is a spot color.

In FIG. 5, this identifier is represented by "S" and "S" is stored in a region in which the information indicating the above-described attribute is stored. If the determination in at least one of steps S220 to S235 is "N", the data of the pixel to be converted is not rewritten at the point in time when step S245 is executed, and a value other than "S" is stored even in the region in which the attribute is stored.

Next, the control unit 20 determines whether the pixel to be converted is a spot color pixel due to processing by the color converting unit 21b5 (step S245) and converts the data of the pixel to be converted into a CMYK value based on the spot color list if it is determined that the pixel to be converted is a spot color pixel (step S250). In detail, it is determined whether the identifier "S" indicating a spot color pixel is stored by referring to the byte region in which the identifier, which indicates a spot color pixel of the data of the pixel to be converted after rewriting shown in FIG. 5, is stored. In addition, if the identifier indicating a spot color pixel is stored, the data of the pixel to be converted is converted into the ink gradation value of the CMYK color coordinate system based on the index number and the spot color list by referring to the region in which the index number of a spot color of the spot color list is stored.

If it is determined that the pixel to be converted is not a spot color pixel in step S245, the control unit 20 performs the interpolation operation using the LUT and converts the RGB value into a CMYK value (step S255). Subsequently, the control unit 20 determines whether the color conversion of all the pixels configuring the image data is completed (step S260), and the process from step S215 to step S255 is repeated if the color conversion of all the pixels has not been completed. If the color conversion of all the pixels is completed, the color conversion process of FIG. 4 is completed. The color-converted image data is subsequently subjected to the halftone process and the rearrangement process, and printing is executed.

As described above, the numerical value range of the gradation values of the first color coordinate system corresponding to the plurality of ink gradation values defined in the spot color list is acquired before the spot color pixel determination, it is first determined whether the gradation value of the pixel to be converted is within the numerical value range at the time of the spot color pixel determination, and if the gradation value of the pixel to be converted is outside of the numerical value range, it is determined that the pixel to be converted is not a spot color pixel. In addition, it is determined whether the pixel which is determined to be in the numerical value range coincides with any one gradation value defined in the spot color list. Accordingly, it is possible to shorten the processing time for the spot color pixel determination, compared with the configuration of the related art (the configuration in which it is determined whether the pixel is a spot color pixel with respect to the number of colors of a spot color with respect to the pixels of the image data of the image to be printed).

As shown in steps S220 to S235, in the present embodiment, the determination whether the gradation value of the pixel to be converted coincides with any one gradation value in the numerical value range is sequentially performed from the gradation value of the channel with the minimum numerical value range out of the three channels, and the second determination and thereafter are performed if it is determined that the gradation value of the channel which is first determined is within the numerical value range. Accordingly, it is possible to further shorten the processing time of the spot color pixel determination.

In detail, for example, as shown in FIG. 6, if a maximum range of the gradation values in the data structure is N (N=256, because the gradation value is 1 byte in the present embodiment), (N-Xr)>(N-Yr)>(N-Zr). Accordingly, there is a higher probability in order of X, Y and Z that the gradation value is included in the range outside of the numerical value range. Accordingly, there is a higher probability that the pixel which is not a spot color pixel can be more quickly eliminated in the spot color pixel determination when the numeral value inside/outside range determination is first performed from the channel X, compared with when the numeral value inside/outside range determination is performed from the channel Y. Thus, there is a high probability that the processing time is further shortened.

In the printing device of the present embodiment, since printing is performed based on the image data, which is color-converted from the RGB color coordinate system into the CMYK color coordinate system, with a processing time shorter than that of the configuration of the related art, it is possible to shorten the total time necessary for the printing of the image data including spot color pixels.

(3) Other Embodiments

The above-described embodiment is only an example of the invention and various embodiments can be employed without departing from the spirit of the invention. For example, although the first color coordinate system is the RGB color coordinate system in the above-described embodiment, for example, the first color coordinate system may be a color coordinate system where colors (grayscale) are represented by a single channel.

In the spot color pixel determining unit 21b4, if the first color coordinate system is composed of the gradation values of a plurality of channels, a 24-bit value may be the object of the numerical value inside/outside range determination, instead of the gradation values of the channels. In detail, for example, if the first color coordinate system is the RGB color coordinate system and the numerical value ranges of the gradation values of the channels have a relationship such that R>B>G, the maximum value Max and the minimum value Min of the numerical value range may be determined as follows.

$$Max = R_{max} <<16 | B_{max} <<8 | G_{max}$$

$$Min = R_{min} <<16 | B_{min} <<8 | G_{Min}$$

In addition, even with respect to the RGB values of the pixels to be converted, (R<<16|B<<8|G)=Color may be obtained such that it is determined whether a color is within the numerical value range, that is, whether a color is equal to or more than Min and equal to or less than Max. In addition, "<<n" indicates n-bit left shift and "|" indicates a logical sum. The reason why a channel having a minimum numerical value range out of three channels is arranged in a high-order byte is so that the range outside of the numerical value range out of $2^{24}$ numerical values is further widened.

The entire disclosure of Japanese Patent Application No: 2008-261378, filed Oct. 8, 2008 expressly incorporated by reference herein

What is claimed is:

1. A spot color printing color converting device comprising:
    an image data acquiring unit for acquiring image data in which the colors of pixels are represented by the gradation values of a first color coordinate system;
    a spot color list acquiring unit for acquiring a spot color list associating the gradation values of the first color coordinate system with the ink gradation values of a second color coordinate system specifying the gradation of ink colors for printing spot colors;
    a numerical value range acquiring unit for acquiring a numerical value range between a minimum value and a maximum value out of a plurality of gradation values of the first color coordinate system associated with the ink gradation values of the second color coordinate system in the spot color list;
    a spot color pixel determining unit for determining whether the gradation value of a pixel to be converted from the image data is within the numerical value range and for determining whether the gradation value of the pixel to be converted coincides with any one gradation value in the numerical value range when the gradation value is within the numerical value range; and
    a color converting unit for converting the gradation value of the pixel to be converted into the ink gradation value of the second color coordinate system associated in the spot color list when the gradation value of the pixel to be converted coincides with any one gradation value in the numerical value range.

2. The spot color printing color converting device according to claim 1, wherein, when the gradation values of the first color coordinate system are represented by the gradation values of n (n is an integer of 3 or more) channels,
    the numerical value range acquiring unit has a unit acquiring the numerical value range with respect to the n channels, and
    the spot color pixel determining unit sequentially determines whether the gradation value of the pixel to be converted coincides with any one gradation value in the numerical value range, from the gradation value of the channel having the minimum numerical value range out of the n channels, and performs the determination of the channel having a smaller $m^{th}$ (m is an integer of $2 \leq m \leq n$) numerical value range if it is determined that the gradation value of a channel having a smaller $(m-1)^{th}$ numerical value range is within the numerical value range.

3. A print control device realizing, on a computer, a print control unit for performing the control for outputting an image to a printing medium based on image data which is color-converted from the first color coordinate system into the second color coordinate system by the spot color printing color conversion device according to claim 1.

4. A spot color printing color converting method comprising:
- acquiring image data in which the colors of pixels are represented by the gradation values of a first color coordinate system;
- acquiring a spot color list associating the gradation values of the first color coordinate system with the ink gradation values of a second color coordinate system specifying the gradation of ink colors for printing spot colors;
- acquiring a numerical value range between a minimum value and a maximum value out of a plurality of gradation values of the first color coordinate system associated with the ink gradation values of the second color coordinate system in the spot color list;
- determining whether the gradation value of a pixel to be converted from the image data is within the numerical value range and determining whether the gradation value of the pixel to be converted coincides with any one gradation value in the numerical value range when the gradation value is within the numerical value range; and
- converting the gradation value of the pixel to be converted into the ink gradation value of the second color coordinate system associated in the spot color list when the gradation value of the pixel to be converted coincides with any one gradation value in the numerical value range.

5. The spot color printing color converting method of claim 4, further comprising:
- acquiring the numerical value range with respect to the n channels, and
- sequentially determining whether the gradation value of the pixel to be converted coincides with any one gradation value in the numerical value range, from the gradation value of the channel having the minimum numerical value range out of the n channels, and performs the determination of the channel having a smaller $m^{th}$ (m is an integer of $2 \leq m \leq n$) numerical value range if it is determined that the gradation value of a channel having a smaller $(m-1)^{th}$ numerical value range is within the numerical value range.

* * * * *